United States Patent
Mellempudi et al.

(10) Patent No.: US 11,068,780 B2
(45) Date of Patent: Jul. 20, 2021

(54) TECHNOLOGIES FOR SCALING DEEP LEARNING TRAINING

(71) Applicant: Intel Corporation, Santa Clara, CA (US)

(72) Inventors: Naveen K. Mellempudi, Bangalore (IN); Srinivas Sridharan, Bangalore (IN); Dheevatsa Mudigere, Bangalore (IN); Dipankar Das, Pune (IN)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 15/476,998

(22) Filed: Apr. 1, 2017

(65) Prior Publication Data
US 2018/0285733 A1    Oct. 4, 2018

(51) Int. Cl.
*G06N 3/08*    (2006.01)
*G06N 3/06*    (2006.01)
*G06N 3/04*    (2006.01)
*G06N 3/063*   (2006.01)

(52) U.S. Cl.
CPC ............. *G06N 3/08* (2013.01); *G06N 3/0454* (2013.01); *G06N 3/063* (2013.01)

(58) Field of Classification Search
CPC ......... G06N 3/08; G06N 3/0454; G06N 3/063
See application file for complete search history.

(56) References Cited

U.S. PATENT DOCUMENTS 10,229,356 B1 *   3/2019   Liu .................. G06N 3/063
2012/0254192 A1 * 10/2012  Gelbard ............ G06F 16/2237
                                            707/745

(Continued)

OTHER PUBLICATIONS

Hubara, Itay, Matthieu Courbariaux, Daniel Soudry, Ran El-Yaniv, and Yoshua Bengio. "Quantized neural networks: Training neural networks with low precision weights and activations." The Journal of Machine Learning Research 18, No. 1 (Jan. 2017): pp. 6869-6898 (Year: 2017).*

(Continued)

*Primary Examiner* — Kamran Afshar
*Assistant Examiner* — Urmana Islam
(74) *Attorney, Agent, or Firm* — Hanley, Flight & Zimmerman, LLC (57) ABSTRACT

Technologies for artificial neural network training include a computing node with a host fabric interface that sends a message that includes one or more artificial neural network training algorithm values to another computing node in response to receipt of a request to send the message. Prior to sending the message, the host fabric interface may receive a request to quantize the message and quantize the message based on a quantization level included in the request to generate a quantized message. The quantization message includes one or more quantized values such that each quantized value has a lower precision than a corresponding artificial neural network training algorithm value. The host fabric interface then transmits the quantized message, which includes metadata indicative of the quantization level, to another computing node in response to quantization of the message for artificial neural network training. Other embodiments are described and claimed.

24 Claims, 5 Drawing Sheets

(56) References Cited

U.S. PATENT DOCUMENTS

2013/0279405 A1* 10/2013 Jafarian ............... H04W 68/02
370/328
2014/0229158 A1* 8/2014 Zweig ..................... G06N 3/08
704/9

OTHER PUBLICATIONS

Han, Song, Xingyu Liu, Huizi Mao, Jing Pu, Ardavan Pedram, Mark A. Horowitz, and William J. Dally. "EIE: efficient inference engine on compressed deep neural network." In 2016 ACM/IEEE 43rd Annual International Symposium on Computer Architecture (ISCA), pp. 243-254. IEEE, (Year: 2016).*

Hubara, Itay, Matthieu Courbariaux, Daniel Soudry, Ran El-Yaniv, and Yoshua Bengio. "Quantized Neural Networks: Training Neural Networks with Low Precision Weights and Activations." arXiv preprint arXiv:1609.07061 (2016). pp. 1-29 (Year: 2016).*

Goodfellow et al., "Deep Learnng," MIT Press, 2016, [retrieved via the Internet at http://www.deeplearningbook.org], 2 pages.

Seide et al., "1-Bit Stochastic Gradient Descent and its Application to Data-Parallel Distributed Training of Speech DNINs," Interspeech 2014, [retrieved via the Internet at https://www.isca-speech.org/archive/archive_papers/interspeech_2014/i14_1058.pdf], 5 pages.

Iandola et al., "FireCaffe: near-linear acceleration of deep neural network training on compute clusters," Jan. 8, 2016, [retrieved via the Internet at https://arxiv.org/abs/1511.00175v2], 13 pages.

* cited by examiner

TECHNOLOGIES FOR SCALING DEEP LEARNING TRAINING

BACKGROUND

Multilayered artificial neural networks are one of the predominant algorithms driving the adoption of Machine Learning (ML) and Artificial Intelligence (AI) across a wide range of application domains, such as image recognition, autonomous driving, and natural language processing. Multilayered artificial neural network training is highly compute-intensive and, thus, training contemporary models to full accuracy may require a long period of time. To improve training time, training applications may be scaled to large multi-node clusters. Certain current approaches to reduce a volume of data communicated for multilayered artificial neural network training have a negative impact on accuracy. A technique for reducing the volume of data communicated for multilayered artificial neural network training includes software-based quantization for weight gradients, which is limited to data-parallel distributed implementations and requires retaining the target buffers in full accuracy to feed the quantization error back into the network. Other techniques for reducing the volume of data include using a compressed model, which may have a negative impact on accuracy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
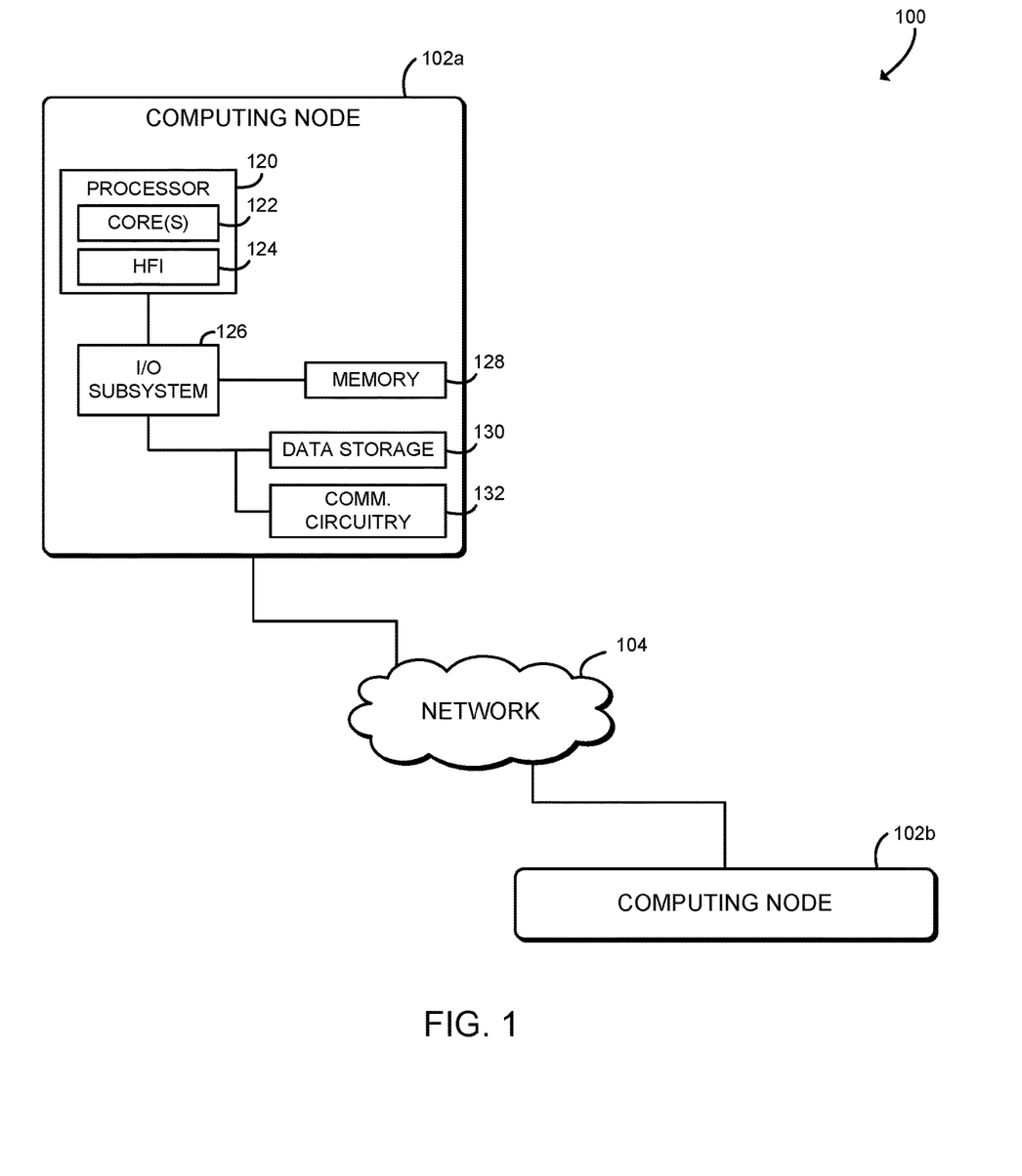
FIG. 1 is a simplified block diagram of at least one embodiment of a system for reducing a volume of communication messages for multilayered artificial neural network training.

Referring now to FIG. 1, in an illustrative embodiment, a system 100 for scaling multilayered artificial neural network training algorithms includes several computing nodes 102 in communication over a network 104. The illustrated system 100 includes two computing nodes 102a, 102b; however, it should be understood that the system 100 may include many more computing nodes 102. In use, as described in more detail below, a sender computing node 102a quantizes and/or compresses original messages that include multilayered artificial neural network training algorithm data and transmits the quantized and/or compressed messages to a receiver computing node 102b. After receiving each message, the receiver computing node 102b reconstructs the original messages and delivers the reconstructed message to an application to perform the multilayered artificial neural network training. The computing nodes 102a, 102b may quantize and/or compress the messages with a combination of software and hardware, for example using a host fabric interface, network interface controller, or other networking hardware of the computing nodes 102a, 102b. It should be appreciated that the quantization and/or compression reduces a volume of messages that are transmitted between the computing nodes 102, thereby reducing the inter-node communication time and shortening the total neural network training time. Additionally, by reducing the volume of network communications, the system 100 may support scaling to large numbers of computing nodes 102, which also improves training time. By using domain knowledge particular to multilayered artificial neural network training, the system 100 may achieve better, higher performance compression than conventional compression algorithms or hardware. Further, the system 100 achieves training convergence with acceptable accuracy even without retaining full-precision values.

Referring again to FIG. 1, each computing node 102 may be embodied as any type of computation or computer device capable of performing the functions described herein, including, without limitation, a computer, a server, a rack-mounted server, a high-performance computing node; a desktop computer, a workstation, a laptop computer, a notebook computer, a tablet computer, a mobile computing device, a wearable computing device, a network appliance, a distributed computing system, a processor-based system, and/or a consumer electronic device. As shown in FIG. 1, the computing node 102 illustratively includes a processor 120, an input/output ("I/O") subsystem 126, a memory 128, a data storage device 130, and communication circuitry 132. It should be appreciated that the computing node 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The illustrative processor 120 includes one or more processor cores 122, each of which is an independent processing unit capable of executing programmed instructions. The processor 120 may be embodied as a single or multi-core processor(s), digital signal processor, microcontroller, or other processor or processing/controlling circuit. The illustrative processor 120 includes a host fabric interface 124. The host fabric interface 124 may be embodied as any communication interface, such as a network interface controller, communication circuit, device, or collection thereof, capable of enabling communications between the processor 120 and other remote computing nodes 102 and/or other remote devices over the network 104. The host fabric interface 124 may be configured to use any one or more communication technology and associated protocols (e.g., Ethernet, InfiniBand®, Intel® Omni-Path Architecture, etc.) to effect such communication. Although illustrated as including a single processor 120, it should be understood that each computing node 102 may include multiple processors 120, and each processor 120 may include an integrated host fabric interface 124.

The memory 128 may be embodied as any type of volatile or non-volatile memory or data storage capable of performing the functions described herein. In operation, the memory 128 may store various data and software used during operation of the computing node 102 such as operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing node 102. For example, the I/O subsystem 126 may be embodied as, or otherwise include, memory controller hubs, input/output control hubs, platform controller hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing node 102, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The communication circuitry 132 of the computing node 102 may be embodied as any communication circuit, device, or collection thereof, capable of enabling communications between the computing node 102 and one or more remote computing nodes 102 and/or other remote devices over the network 104. The communication circuitry 132 may be configured to use any one or more communication technology (e.g., wired or wireless communications) and associated protocols (e.g., Ethernet, InfiniBand®, Intel® Omni-Path Architecture, Bluetooth®, Wi-Fi®, WiMAX, etc.) to effect such communication.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 2:
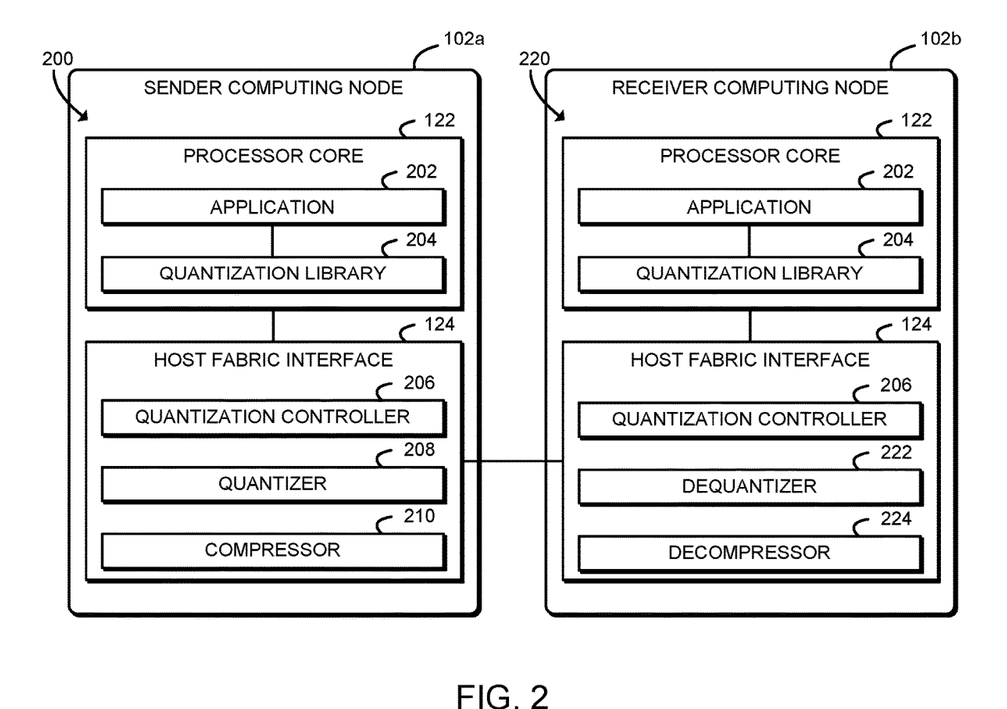
FIG. 2 is a simplified block diagram of at least one embodiment of an environment that may be established by computing nodes of the system of FIG. 1.

Referring now to FIG. 2, in an illustrative embodiment, a computing node 102a establishes an environment 200 during operation, and a computing node 102b establishes an environment 220 during operation. In the illustrative embodiment, the computing node 102a is shown as the sender computing node and the computing node 102b is shown as the receiver computing node. It should be appreciated that, in some embodiments, the roles of the computing nodes 102a, 102b and their respective environments 200, 220 may be reversed for communication in the other direction (i.e., the computing node 102a may establish the environment 220 to receive messages and the computing node 102a may establish the environment 200 to send messages).

The illustrative environment 200 of the sender computing node 102a includes an application 202, a quantization library 204, a quantization controller 206, a quantizer 208, and a compressor 210. The various components of the environment 200 may be embodied as hardware, firmware, software, or a combination thereof. As such, in some embodiments, one or more of the components of the environment 200 may be embodied as circuitry or collection of electrical devices (e.g., application circuitry 202, quantization library circuitry 204, quantization controller circuitry 206, quantizer circuitry 208, and/or compressor circuitry 210). It should be appreciated that, in such embodiments, one or more of the application circuitry 202, the quantization library circuitry 204, the quantization controller circuitry

206, the quantizer circuitry 208, and/or the compressor circuitry 210 may form a portion of the processor 120, the host fabric interface 124, the I/O subsystem 126, the communication circuitry 132, and/or other components of the computing node 102. Additionally, in some embodiments, one or more of the illustrative components may form a portion of another component and/or one or more of the illustrative components may be independent of one another.

The application 202 of the sender computing node 102a may be embodied as any executable code, native code, managed code, user application, system application, or other program that is executed by the sender computing node 102a. In particular, the application 202 may be embodied as a convolutional neural network, recurrent neural network, or other multilayered artificial neural network and/or related training algorithm. The application 202 may be hosted, executed, or otherwise established by one or more of the processor cores 122 of the processor 120. Thus, the application 202 may be executed by a processor core 122.

In the illustrative embodiment, the application 202 is configured to communicate with the host fabric interface 124 via a quantization library 204. The application 202 of the sender computing node 102a requests the host fabric interface 124 to send a message to one or more receiver computing nodes 102b. In the illustrative embodiment, the message may include one or more artificial neural network training algorithm values, and each artificial neural network training algorithm value may be embodied as an activation value, a weight value, or a weight update value. Prior to sending the message to the receiver computing node(s) 102b, the application 202 may request the host fabric interface 124 to reduce the size of the message by quantizing the message based on a quantization level determined by the application. For example, each artificial neural network training algorithm value may be embodied as a 32-bit data, and the quantization level may be 16-bit, 8-bit, or 4-bit. It should be appreciated that the quantized message includes the quantization level of the message such that the unquantized message can be reconstructed by the receiver computing node 102b. It should be appreciated that the quantization library 204 may be integrated into a message passing interface (MPI) or other middleware library to communicate with the host fabric interface 124.

As described above, the host fabric interface 124 is configured to communicate with the application 202 to receive a quantization request to quantize a message, a compression request to compress a message, and/or a message request to send a message to one or more receiver computing devices 102b. To do so, the host fabric interface 124 includes the quantization controller 206, the quantizer 208, and the compressor 210.

The quantization controller 206 is configured to receive a request to quantize a message and a request to send the message to one or more receiver computing devices 102b. In the illustrative embodiment, the request indicative of a quantization level is received from the application 202 of the sender computing node 102a via the quantization library 204. It should be appreciated that, in some embodiments, the quantization controller 206 may receive the quantization request via a middleware library such as MPI. In other words, the quantization controller 206 determines which message requires quantization based on the quantization request and the quantization level received from the application 202. In some embodiments, the quantization controller 206 may further receive a request to compress the message. In such embodiment, the quantization controller 206 is further configured to determine which message requires compression based on the compression request received from the application 202.

The quantizer 208 is configured to determine a quantization level for a message in response to receipt of the request to send the message and receipt of the request to quantize the message from the application 202. The quantizer 208 is further configured to quantize the message based on the quantization level to generate a quantized message including one or more quantized values. In other words, the quantization results with a reduced number of bits (e.g., 16-bit, 8-bit, or 4-bit) or other information units required to represent the quantized message. It should be appreciated that the quantized message includes metadata indicative of the quantization level of the quantized message. For example, the quantization level may be represented by a field of the header that includes up to four bits. In the illustrative embodiment, the quantizer 208 is configured to operate with integer and floating-point real numbers. It should be appreciated that the quantizer 208 may be used to quantize complex numbers.

The compressor 210 is configured to compress a message to generate a compressed message in response to receipt of a request to compress the message from the application 202. In some embodiments, the compressor 210 may compress a quantized message to generate a compressed quantized message in response to receipt of a request to compress the message. In some embodiments, the compressor 210 compresses the message by removing zero values and packing non-zero values into a contiguous buffer. In such embodiment, the compressor 210 generates a bitmap indicative of one or more indices of one or more non-zero values of the message and removes one or more zero values from the message. It should be appreciated that the compressed message includes metadata indicative of the compression state of the message. For example, the header of the message may include a bit indicating the compression state of the message. Thus, by reducing the volume of the messages transmitted to the receiver computing node 102b for multilayered artificial neural network training, the system 100 may reduce the time to train multilayered neural network models.

Still referring to FIG. 2, the illustrative environment 220 of the receiver computing node 102b includes the application 202, the quantization library 204, the quantization controller 206, a dequantizer 222, and a decompressor 224. The various components of the environment 220 may be embodied as hardware, firmware, software, or a combination thereof. As such, in some embodiments, one or more of the components of the environment 220 may be embodied as circuitry or collection of electrical devices (e.g., application circuitry 202, quantization library circuitry 204, quantization controller circuitry 206, dequantizer circuitry 222, and/or decompressor circuitry 224). It should be appreciated that, in such embodiments, one or more of the application circuitry 202, the quantization library circuitry 204, the quantization controller circuitry 206, the dequantizer circuitry 222, and/or the decompressor circuitry 224 may form a portion of the processor 120, the host fabric interface 124, the I/O subsystem 126, the communication circuitry 132, and/or other components of the computing node 102. Additionally, in some embodiments, one or more of the illustrative components may form a portion of another component and/or one or more of the illustrative components may be independent of one another.

The application 202 communicates with the host fabric interface 124 via a quantization library 204 in order to receive messages sent by the sender computing node 102a.

The application 202 and the quantization library 204 established by the receiver computing node 102b may be the same as the application 202 and the quantization library 204 established by the sender computing node 102a. Thus the description of the application 202 and the quantization library 204 is not repeated herein so as not to obscure the clarity of this disclosure.

The host fabric interface 124 is configured to reconstruct received messages in response to receiving the quantized and/or compressed messages from the sender computing node 102a and further provide the reconstructed message to the application 202. To do so, the host fabric interface 124 includes the quantization controller 206, the dequantizer 222, and the decompressor 224.

The quantization controller 206 is configured to deliver the reconstructed message to a corresponding application 202 executed by the receiver computing node 102b. To do so, the quantization controller 206 may determine which received messages are required to be dequantized and/or decompressed based on metadata included in each of the received messages. In some embodiments, the quantization controller 206 may receive a dequantization request and a dequantization level from the application 202 of the receiver computing node 102b to dequantize the received message based on the dequantization level. It should be appreciated that, in some embodiments, the quantization controller 206 may receive the dequantization request via a middleware library such as MPI. Additionally, the quantization controller 206 may also receive a decompression request from the application 202 of the receiver computing node 102b to decompress the received message.

The decompressor 224 is configured to determine whether the received message is compressed based on the metadata of the received message. For example, the metadata may include a bit which indicates the compression state of the message. As discussed above, in the illustrative embodiment, a compressor 210 of a sender computing node 102a compresses a message by removing zero values from an original or quantized message and generates a bitmap indicative of indices of non-zero values of the message. In response to receiving the compressed message, a decompressor 224 decompresses the received message by adding zero values back to the compressed message based on the bitmap embedded in the received message to reconstruct the uncompressed message. It should be appreciated that the uncompressed message may be quantized.

The dequantizer 222 is configured to determine the quantization level of the quantized message based on the metadata of the received message (or the uncompressed message). The dequantizer 222 is further configured to dequantize the received message or uncompressed message based on the determined quantization level. For example, a quantizer 208 of a sender computing node 102a may quantize a 32-bit message down to 16-bit message and include a quantization level as a part of the message. In response to receiving the quantized message, a dequantizer 222 of a receiver computing node 102b may dequantize the received 16-bit message back to a 32-bit message. The reconstructed message is then transmitted from the host fabric interface 124 to a corresponding application 202 of the receiver computing node 102b. It should be appreciated that, in the illustrative embodiment, the dequantized message includes multiple artificial neural network training algorithm values, and each artificial neural network training algorithm value has a higher precision than a corresponding quantized value of the received message.

Figure 3:
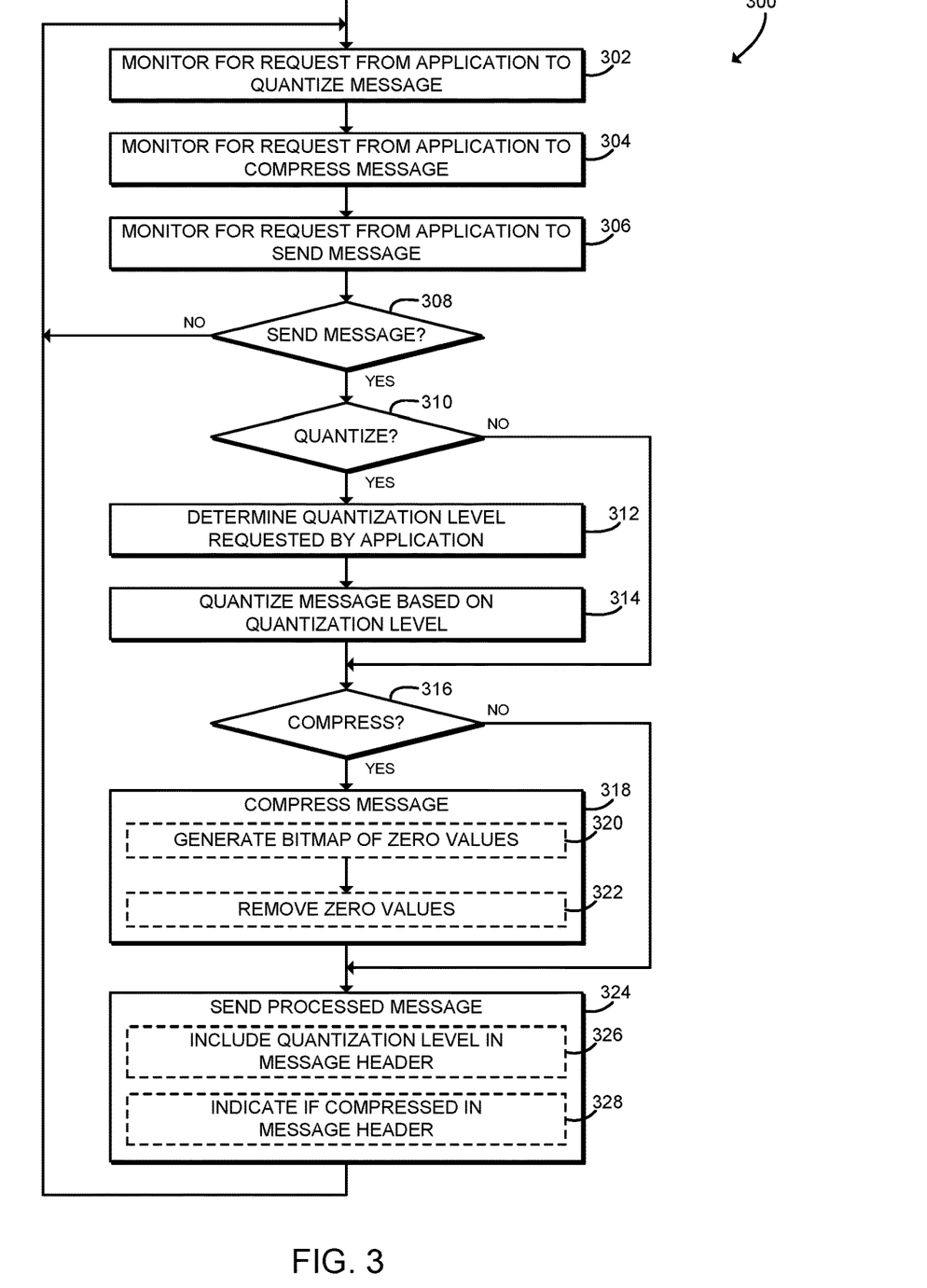
FIG. 3 is a simplified flow diagram of at least one embodiment of a method for sending training algorithm data from a sender computing node to a receiver computing node that may be executed by a host-fabric interface of the sender computing node of the system of FIGS. 1 and 2.

Referring now to FIG. 3, in use, the host fabric interface 124 of the sender computing node 102a may execute a method 300 for sending training algorithm messages. The method 300 begins with block 302, in which the host fabric interface 124 of the sender computing node 102a monitors for a quantization request from an application 202 to quantize a message. The quantization request is a configuration request that may be received from the quantization library 204 and/or the application 202. For example, the application 202 may submit the quantization request via a middleware library such as MPI. The request may be embodied, for example, as a key of an MPI Info object. As discussed above, the quantization request includes a quantization level indicative of a reduced size of a message that is to be communicated to one or more receiver computing nodes 102b. In the illustrative embodiment, the quantization level may be 16-bit, 8-bit, or 4-bit quantization level. However, it should be appreciated that, in some embodiments, the quantization level may be any level of quantization that reduces the precision of the value, thereby reducing the number of bits required to represent the message.

In block 304, the host fabric interface 124 further monitors for a compression request from the application 202. The compression request includes a request to compress a message or a quantized message received from the application 202 and/or the quantization library 204. Similar to the quantization request, the application 202 may submit the compression request via a middleware library such as MPI, and the request may be embodied as a key of an MPI Info object. Additionally, although illustrated as monitoring for a quantization request followed by a message request, it should be understood that the quantization request and the compression request may be received at different times, at the same time, and/or in any order.

In block 306, the host fabric interface 124 monitors for a message request from the application 202 to send a message to one or more receiver computing nodes 102b. As discussed above, in the illustrative embodiment, the message includes training algorithm data, such as one or more weights, weight updates, activation values, or any other value generated by a training algorithm. Each item of the training algorithm data may be embodied as a floating point value, typically a 32-bit float. In block 308, the host fabric interface 124 determines whether the message request has been received from the application 202. If a message request was not received, the method 300 loops back to block 302 to continue monitoring for the requests from the application 202. If, however, the host fabric interface 124 determines that a message request has been received, the method 300 advances to block 310.

In block 310, in response to receiving a message request, the host fabric interface 124 further determines whether the host fabric interface 124 has received a quantization request from the application 202 to quantize the message. As described above, in the illustrative embodiment, the quantization request may be supplied by the application 202 as an MPI info key or other metadata to the quantization library 204, and may be communicated using any appropriate technique to the host fabric interface 124. If the host fabric interface 124 determines that the quantization request has not been received, the method 300 skips ahead to block 316. If, however, the host fabric interface 124 determines that the quantization request has been received, the method 300 advances to block 312.

In block 312, the host fabric interface 124 determines a quantization level requested by the application 202. It should be appreciate that, in some embodiments, a quantization level may be requested by the quantization library 204 through an interface established by the host fabric interface 124, and the application 202 may specify the quantization level to the quantization library 204 using a MPI or other middleware library to control the quantization of the message.

In block 314, the host fabric interface 124 quantizes the message based on the determined quantization level. It should be appreciated that the quantization may be embodied as any algorithm that reduces the precision of one or more training algorithm values of the message, thereby reducing the number of bits required to represent the message. In the illustrative embodiment, each item of training algorithm data is embodied as a 32-bit floating-point value. The 32-bit floating-point value may be quantized to a fixed-point representation of a specified bit width, for example, a fixed-point 16-bit, 8-bit, or 4-bit value, such that the quantized value has a lower precision than the training algorithm data. In other words, by quantizing the training algorithm data, the host fabric interface 124 reduces a total volume of the training algorithm data that is to be transmitted to the receiver computing node 102b.

In block 316, the host fabric interface 124 determines whether a compression request was received from the application 202. In the illustrative embodiment, the compression request may be supplied as an MPI info key or other metadata to the quantization library 204, and may be communicated using any appropriate technique to the host fabric interface 124. It should be appreciated that, in some embodiments, the compression request may be sent only to compress activation data of the training algorithm, since the activation data for artificial neural net topologies typically includes many zero values. If the host fabric interface 124 determines that the compression request has not been received, the method 300 skips ahead to block 324, described further below. If, however, the host fabric interface 124 determines that the compression request has been received, the method 300 advances to block 318.

In block 318, the host fabric interface 124 compresses the message or quantized message as requested by the application 202. The host fabric interface 124 may use any appropriate technique to compress the message. For example, in some embodiments the host fabric interface 124 may perform run-length encoding or another lossless compression algorithm In the illustrative embodiment, the host fabric interface 124 performs a zero squashing compression algorithm to compress the message. To do so, in block 320, the host fabric interface 124 may generate a bitmap with each bit indicative of the position of a non-zero value in the message. The zeros may then be removed from the message in block 322. To remove the zero values, non-zero values may be copied into a contiguous buffer that is then included in the message. The bitmap may be included as part of the message so that a receiver computing node 102b may reconstruct the message in response to receiving the compressed message. As described above, because activation data for training algorithms typically includes many zero values, removing the zeroes may reduce total message size.

In block 324, the host fabric interface 124 sends the processed message (e.g., the quantized and/or compressed message) to one or more receiver computing nodes 102b. It should be appreciated that the processed message includes metadata indicative of the quantization level and/or the compression state. The metadata may have any appropriate size or format, and in some embodiments the metadata may be variably sized. For example, the metadata may include a field indicative of the size of a message header, followed by the message header itself. In some embodiments, in block 326 the host fabric interface 124 may include the quantization level in a header of the message. For example, the quantization level may be represented by a field of the header that includes up to four bits. In some embodiments, in block 328 the host fabric interface 124 may indicate in the header whether the message is compressed. For example, a single bit of the header may indicate whether the message is compressed. After sending the message, the method 300 loops back to block 302 to continue monitoring for requests from the application 202. Additionally, although illustrated as potentially quantizing the message in block 314 and then compressing the message in block 318, it should be understood that in some embodiments those operations may be performed in a different order (e.g., in some embodiments zeros may be removed and then the values may be quantized).

Figure 4:
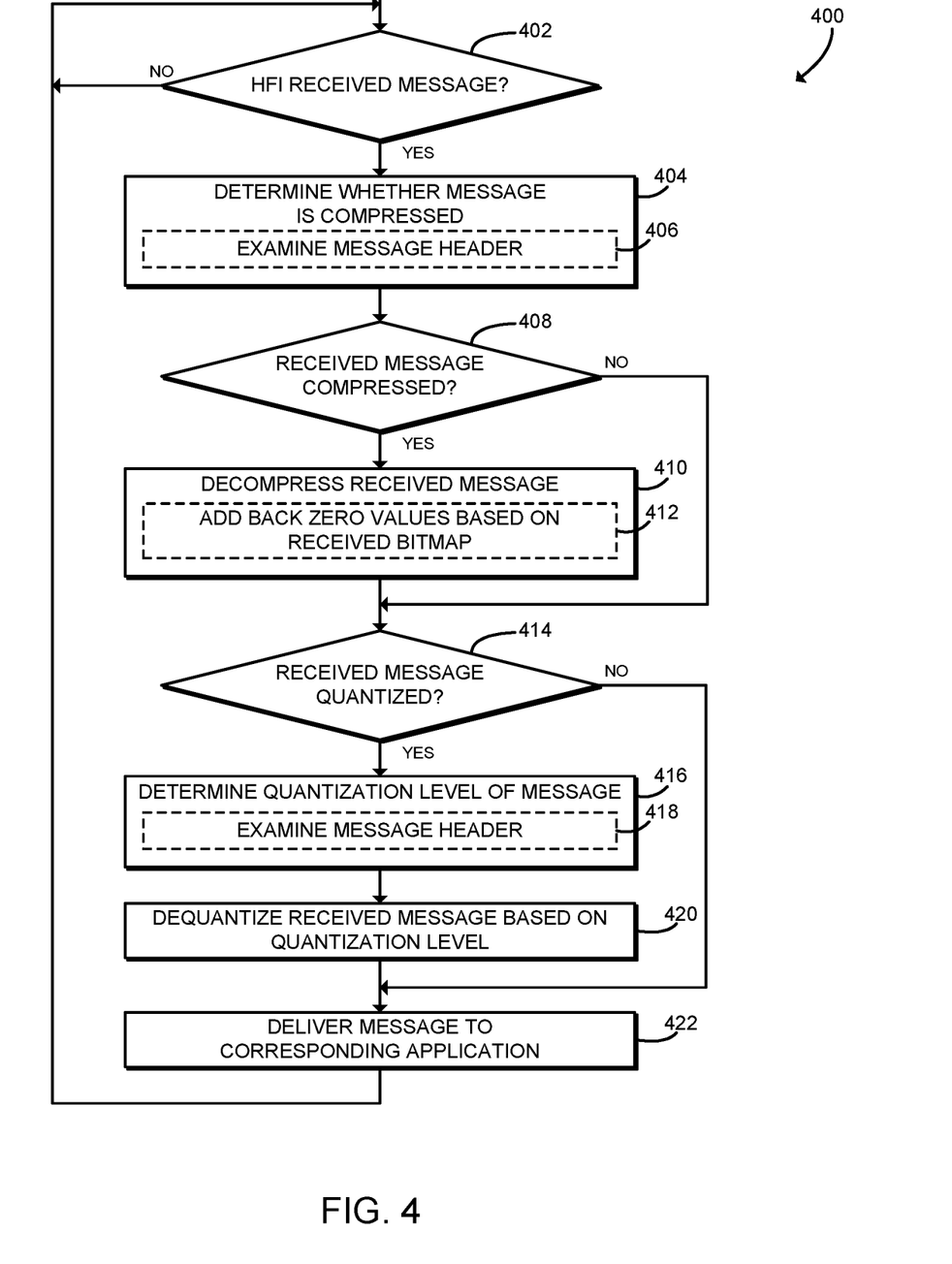
FIG. 4 is a simplified flow diagram of at least one embodiment of a method for receiving training algorithm data sent from a sender computing node to a receiver computing node that may be executed by a host-fabric interface of the receiver computing node of the system of FIGS. 1 and 2.

Referring now to FIG. 4, in use, a host fabric interface 124 of a receiver computing node 102b may execute a method 400 for receiving training algorithm messages from a sender computing node 102a. The method 400 begins with block 402, in which the host fabric interface 124 of the receiver computing node 102b determines whether a message has been received from a sender computing node 102a. If a message has not been received, the method 400 loops back to block 402 to continue waiting for a message. If, however, a message has been received, the method 400 advances to block 404.

In block 404, the host fabric interface 124 determines whether the received message is compressed. To do so, in some embodiments, in block 406 the host fabric interface 124 may examine a header of the received message to determine whether the received message is compressed. As discussed above, the header of the message may include a bit indicating the compression state of the message. In block 408, the host fabric interface 124 determines whether the received message is compressed. If not, the method 400 skips ahead to block 414. However, if the host fabric interface 124 determines that the received message is compressed, the method advances to block 410.

In block 410, the host fabric interface 124 decompresses the received message. The host fabric interface 124 may use any appropriate technique to decompress the message. For example, in some embodiments the host fabric interface 124 may perform decompression using run-length encoding or any other lossless decompression algorithm In the illustrative embodiment, the host fabric interface 124 performs decompression using a zero squashing compression algorithm. To do so, in block 412 the host fabric interface 124 may add back the zeros values that were removed during the compression of the message by the sender computing device 102a. To do so, the host fabric interface 124 may further examine a bitmap included with the received message to determine positions of the zero values based on the bitmap, and add back zero values to reconstruct the decompressed received message. As discussed above, the message may include a bitmap with each bit indicative of the position of a non-zero value in the message.

In block 414, the host fabric interface 124 further determines whether the received message is quantized. For example, the host fabric interface 124 may examine metadata such as a message header to determine whether the message is quantized. If the host fabric interface 124 determines that the received message is not quantized, the method 400 skips ahead to block 422, described below. If, however, the host fabric interface 124 determines that the received message is quantized, the method 400 advances to block 416.

In block 416, the host fabric interface 124 determines a quantization level of the message. To do so, in block 418, the host fabric interface 124 may examine the header of the message. For example, the quantization level may be represented by a field of the header that includes up to four bits. As discussed above, the header of the message may include the quantization level indicative of the reduced number of bits or information units that represent the quantized message.

In block 420, the host fabric interface 124 dequantizes the received message to reconstruct the dequantized message based on the determined quantized level of the quantized message. The host fabric interface 124 may perform any dequantization algorithm that increases the precision of data included in the message to the precision expected by the application 202. For example, the host fabric interface 124 may convert fixed-point data of a specified bit width (e.g., 16-bit, 8-bit, or 4-bit values) into 32-bit floating-point values expected by the application 202.

In block 422, the host fabric interface 124 delivers the reconstructed message (i.e., the decompressed and/or dequantized message) to the corresponding application 202. The method 400 then loops back to block 402 to continue waiting for another message from the one or more sender computing nodes 102a.

Figure 5:
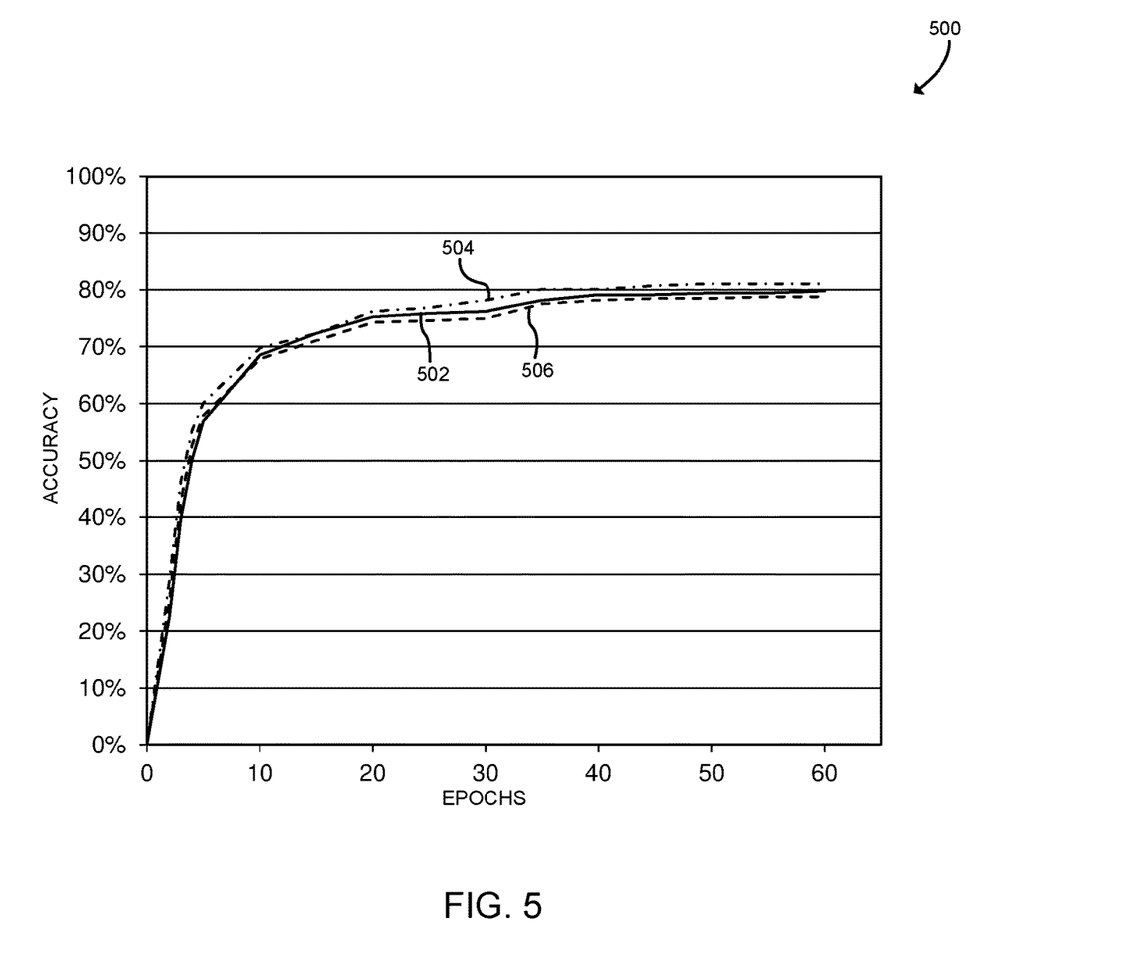
FIG. 5 is a simplified graph illustrating experimental results for convergence of 16-bit and 8-bit quantization of the multilayered artificial neural network training algorithms.

Referring now to FIG. 5, a simplified graph 500 illustrates experimental results that may be generated by an illustrative embodiment of the system 100. In the illustrative embodiment, a system 100 was configured with the AlexNet convolutional neural network topology, and then training was performed using messages with no quantization, 16-bit quantization, and 8-bit quantization. As shown, the graph 500 includes a curve 502 that illustrates baseline convergence performance with no quantization, a curve 504 that illustrates convergence performance with 16-bit communication, and a curve 506 that illustrates convergence performance with 8-bit quantization. Thus, the graph 500 illustrates that there is no or nearly no loss of accuracy of multilayered artificial neural network training when communication messages are quantized to 16-bit values, and that accuracy is within 1-2% for 8-bit quantization. It should be appreciated that for 8-bit quantization, the 1-2% accuracy gap may be bridged by hyperparameter tuning of the training algorithm or other optimization to reduce the gap even further. Therefore, the system 100 reduces the volume of communication messages for multilayered artificial neural network training without sacrificing accuracy to effectively shorten the overall training time.

EXAMPLES

Illustrative examples of the technologies disclosed herein are provided below. An embodiment of the technologies may include any one or more, and any combination of, the examples described below.

Example 1 includes a computing node for sending training algorithm data, the computing node comprising a host fabric interface, wherein the host fabric interface comprises a quantization controller to (i) receive a request to quantize a message, wherein the request is indicative of a quantization level, and (ii) receive a request to send the message, wherein the message comprises one or more artificial neural network training algorithm values; and a quantizer to (i) determine the quantization level for the message in response to receipt of the request to send the message and receipt of the request to quantize the message, (ii) quantize the message based on the quantization level to generate a quantized message, wherein the quantized message comprises one or more quantized values, and wherein each quantized value has a lower precision than a corresponding artificial neural network training algorithm value, and (iii) transmit the quantized message to a receiver computing node in response to quantization of the message, wherein the quantized message further comprises metadata indicative of the quantization level.

Example 2 includes the subject matter of Example 1, and wherein the quantized message comprises a header, and wherein the metadata indicative of the quantization level comprises a field of the header of the quantized message.

Example 3 includes the subject matter of any of Examples 1 and 2, and wherein each artificial neural network training algorithm value comprises a 32-bit floating point value.

Example 4 includes the subject matter of any of Examples 1-3, and wherein the quantization level comprises a 16-bit level and each quantized value comprises a fixed-point 16-bit value.

Example 5 includes the subject matter of any of Examples 1-4, and wherein the quantization level comprises an 8-bit level and each quantized value comprises a fixed-point 8-bit value.

Example 6 includes the subject matter of any of Examples 1-5, and wherein the quantization level comprises a 4-bit level and each quantized value comprises a fixed-point 4-bit value.

Example 7 includes the subject matter of any of Examples 1-6, and wherein the quantization controller is further to receive a request to compress the message; the host fabric interface further comprises a compressor to compress the quantized message to generate a compressed quantized message in response to receipt of the request to compress the message; and to transmit the quantized message comprises to transmit the compressed quantized message in response to compression of the quantized message, wherein the compressed quantized message comprises metadata indicative of whether the compressed quantized message is compressed.

Example 8 includes the subject matter of any of Examples 1-7, and wherein the quantized message comprises a header, and wherein the metadata indicative of whether the compressed quantized message is compressed comprises a bit of the header of the quantized message.

Example 9 includes the subject matter of any of Examples 1-8, and wherein to compress the quantized message comprises to (i) generate a bitmap indicative of one or more indices of one or more non-zero values of the message and (ii) remove one or more zero values in the message; and to transmit the compressed quantized message further comprises to transmit the bitmap.

Example 10 includes the subject matter of any of Examples 1-9, and further including an application to (i) send the request to quantize the message to the host fabric interface and (ii) send the request to send the message to the host fabric interface, wherein the application comprises a training algorithm for a multilayered artificial neural network.

Example 11 includes the subject matter of any of Examples 1-10, and wherein each artificial neural network training algorithm value comprises an activation value, a weight value, or a weight update value.

Example 12 includes the subject matter of any of Examples 1-11, and wherein the multilayered artificial neural network comprises a deep learning neural network.

Example 13 includes the subject matter of any of Examples 1-12, and wherein the multilayered artificial neural network comprises a convolutional neural network.

Example 14 includes the subject matter of any of Examples 1-13, and wherein the multilayered artificial neural network comprises a recurrent neural network.

Example 15 includes a computing node for receiving training algorithm data, the computing node comprising a host fabric interface, wherein the host fabric interface comprises a dequantizer to receive a quantized message from a sender computing node, wherein the quantized message comprises a plurality of quantized values and metadata indicative of a quantization level; determine the quantization level of the quantized message based on the metadata of the quantized message; and dequantize the quantized message based on the quantization level to generate a dequantized message, wherein the dequantized message comprises a plurality of artificial neural network training algorithm values, and wherein each artificial neural network training algorithm value has a higher precision than a corresponding quantized value.

Example 16 includes the subject matter of Example 15, and wherein the quantized message comprises a header, and wherein the metadata indicative of the quantization level comprises a field of the header of the quantized message.

Example 17 includes the subject matter of any of Examples 15 and 16, and wherein each artificial neural network training algorithm value comprises a 32-bit floating point value.

Example 18 includes the subject matter of any of Examples 15-17, and wherein the quantization level comprises a 16-bit level and each quantized value comprises a fixed-point 16-bit value.

Example 19 includes the subject matter of any of Examples 15-18, and wherein the quantization level comprises an 8-bit level and each quantized value comprises a fixed-point 8-bit value.

Example 20 includes the subject matter of any of Examples 15-19, and wherein the quantization level comprises a 4-bit level and each quantized value comprises a fixed-point 4-bit value.

Example 21 includes the subject matter of any of Examples 15-20, and wherein the host fabric interface further comprises a decompressor to determine whether the quantized message is compressed based on the metadata of the quantized message, wherein the metadata is further indicative of whether the quantized message is compressed; and decompress the quantized message to generate a decompressed quantized message in response to a determination that the quantized message is compressed; wherein to dequantize the quantized message comprises to dequantize the decompressed quantized message in response to decompression of the quantized message.

Example 22 includes the subject matter of any of Examples 15-21, and wherein the quantized message comprises a header, and wherein the metadata indicative of whether the quantized message is compressed comprises a bit of the header of the quantized message.

Example 23 includes the subject matter of any of Examples 15-22, and wherein to receive the quantized message comprises to receive a bitmap, wherein the bitmap is indicative of one or more indices of one or more non-zero values of the uncompressed quantized message; and to decompress the received message comprises to add one or more zero values to the quantized message based on the bitmap to generate the uncompressed quantized message.

Example 24 includes the subject matter of any of Examples 15-23, and wherein the host fabric interface further comprises a quantization controller to deliver the dequantized message to an application executed by the computing node, wherein the application comprises a training algorithm for a multilayered artificial neural network.

Example 25 includes the subject matter of any of Examples 15-24, and wherein each artificial neural network training algorithm value comprises an activation value, a weight value, or a weight update value.

Example 26 includes the subject matter of any of Examples 15-25, and wherein the multilayered artificial neural network comprises a deep learning neural network.

Example 27 includes the subject matter of any of Examples 15-26, and wherein the multilayered artificial neural network comprises a convolution neural network.

Example 28 includes the subject matter of any of Examples 15-27, and wherein the multilayered artificial neural network comprises a recurrent neural network.

Example 29 includes a method for sending training algorithm data, the method comprising receiving, by a host fabric interface of a computing node, a request to quantize a message, wherein the request is indicative of a quantization level; receiving, by the host fabric interface, a request to send the message, wherein the message comprises one or more artificial neural network training algorithm values; determining, by the host fabric interface, the quantization level for the message in response to receiving the request to send the message and receiving the request to quantize the message; quantizing, by the host fabric interface, the message based on the quantization level to generate a quantized message, wherein the quantized message comprises one or more quantized values, and wherein each quantized value has a lower precision than a corresponding artificial neural network training algorithm value; and transmitting, by the host fabric interface, the quantized message to a receiver computing node in response to quantizing the message, wherein the quantized message further comprises metadata indicative of the quantization level.

Example 30 includes the subject matter of Example 29, and wherein the quantized message comprises a header, and wherein the metadata indicative of the quantization level comprises a field of the header of the quantized message.

Example 31 includes the subject matter of any of Examples 29 and 30, and wherein each artificial neural network training algorithm value comprises a 32-bit floating point value.

Example 32 includes the subject matter of any of Examples 29-31, and wherein the quantization level comprises a 16-bit level and each quantized value comprises a fixed-point 16-bit value.

Example 33 includes the subject matter of any of Examples 29-32, and wherein the quantization level comprises an 8-bit level and each quantized value comprises a fixed-point 8-bit value.

Example 34 includes the subject matter of any of Examples 29-33, and wherein the quantization level comprises a 4-bit level and each quantized value comprises a fixed-point 4-bit value.

Example 35 includes the subject matter of any of Examples 29-34, and further including receiving, by the host fabric interface, a request to compress the message; and compressing, by the host fabric interface, the quantized message to generate a compressed quantized message in response to receiving the request to compress the message; wherein transmitting the quantized message comprises transmitting the compressed quantized message in response to compressing the quantized message, wherein the compressed quantized message comprises metadata indicative of whether the compressed quantized message is compressed.

Example 36 includes the subject matter of any of Examples 29-35, and wherein the quantized message comprises a header, and wherein the metadata indicative of whether the compressed quantized message is compressed comprises a bit of the header of the quantized message.

Example 37 includes the subject matter of any of Examples 29-36, and wherein compressing the quantized message comprises (i) generating a bitmap indicative of one or more indices of one or non-zero values of the message and (ii) removing one or more zero values from the message; and transmitting the compressed quantized message further comprises transmitting the bitmap.

Example 38 includes the subject matter of any of Examples 29-37, and further including sending, by an application executed by the computing node, the request to quantize the message to the host fabric interface, wherein the application comprises a training algorithm for a multilayered artificial neural network; and sending, by the application, the request to send the message to the host fabric interface.

Example 39 includes the subject matter of any of Examples 29-38, and wherein each artificial neural network training algorithm value comprises an activation value, a weight value, or a weight update value.

Example 40 includes the subject matter of any of Examples 29-39, and wherein the multilayered artificial neural network comprises a deep learning neural network.

Example 41 includes the subject matter of any of Examples 29-40, and wherein the multilayered artificial neural network comprises a convolutional neural network.

Example 42 includes the subject matter of any of Examples 29-41, and wherein the multilayered artificial neural network comprises a recurrent neural network.

Example 43 includes a method for receiving training algorithm data, the method comprising receiving, by a host fabric interface of a computing node, a quantized message from a sender computing node, wherein the quantized message comprises a plurality of quantized values and metadata indicative of a quantization level; determining, by the host fabric interface, the quantization level of the quantized message based on the metadata of the quantized message; and dequantizing, by the host fabric interface, the quantized message based on the quantization level to generate a dequantized message, wherein the dequantized message comprises a plurality of artificial neural network training algorithm values, and wherein each artificial neural network training algorithm value has a higher precision than a corresponding quantized value.

Example 44 includes the subject matter of Example 43, and wherein the quantized message comprises a header, and wherein the metadata indicative of the quantization level comprises a field of the header of the quantized message.

Example 45 includes the subject matter of any of Examples 43 and 44, and wherein each artificial neural network training algorithm value comprises a 32-bit floating point value.

Example 46 includes the subject matter of any of Examples 43-45, and wherein the quantization level comprises a 16-bit level and each quantized value comprises a fixed-point 16-bit value.

Example 47 includes the subject matter of any of Examples 43-46, and wherein the quantization level comprises an 8-bit level and each quantized value comprises a fixed-point 8-bit value.

Example 48 includes the subject matter of any of Examples 43-47, and wherein the quantization level comprises a 4-bit level and each quantized value comprises a fixed-point 4-bit value.

Example 49 includes the subject matter of any of Examples 43-48, and further including determining, by the host fabric interface, whether the quantized message is compressed based on the metadata of the quantized message, wherein the metadata is further indicative of whether the quantized message is compressed; and decompressing, by the host fabric interface, the quantized message to generate a decompressed quantized message in response to determining that the quantized message is compressed; wherein dequantizing the quantized message comprises dequantizing the decompressed quantized message in response to decompressing the quantized message.

Example 50 includes the subject matter of any of Examples 43-49, and wherein the quantized message comprises a header, and wherein the metadata indicative of whether the quantized message is compressed comprises a bit of the header of the quantized message.

Example 51 includes the subject matter of any of Examples 43-50, and wherein receiving the quantized message comprises receiving a bitmap, wherein the bitmap is indicative of one or more indices of one or more non-zero values of the uncompressed quantized message; and decompressing the quantized message comprises adding one or more zero values to the quantized message based on the bitmap to generate the uncompressed quantized message.

Example 52 includes the subject matter of any of Examples 43-51, and further including delivering, by the host fabric interface, the dequantized message to an application executed by the computing node, wherein the application comprises a training algorithm for a multilayered artificial neural network.

Example 53 includes the subject matter of any of Examples 43-52, and wherein each artificial neural network training algorithm value comprises an activation value, a weight value, or a weight update value.

Example 54 includes the subject matter of any of Examples 43-53, and wherein the multilayered artificial neural network comprises a deep learning neural network.

Example 55 includes the subject matter of any of Examples 43-54, and wherein the multilayered artificial neural network comprises a convolutional neural network.

Example 56 includes the subject matter of any of Examples 43-55, and wherein the multilayered artificial neural network comprises a recurrent neural network.

Example 57 includes a computing device comprising a processor; and a memory having stored therein a plurality of instructions that when executed by the processor cause the computing device to perform the method of any of Examples 29-56.

Example 58 includes one or more machine readable storage media comprising a plurality of instructions stored thereon that in response to being executed result in a computing device performing the method of any of Examples 29-56.

Example 59 includes a computing device comprising means for performing the method of any of Examples 29-56

Example 60 includes a computing node for sending training algorithm data, the computing node comprising a host fabric interface, wherein the host fabric interface comprises means for (i) receiving a request to quantize a message, wherein the request is indicative of a quantization level, and (ii) receiving a request to send the message, wherein the message comprises one or more artificial neural network training algorithm values; and means for (i) determining the quantization level for the message in response to receipt of the request to send the message and receipt of the request to quantize the message, (ii) quantizing the message based on the quantization level to generate a quantized message, wherein the quantized message comprises one or more quantized values, and wherein each quantized value has a lower precision than a corresponding artificial neural network training algorithm value, and (iii) transmitting the quantized message to a receiver computing node in response to quantization of the message, wherein the quantized message further comprises metadata indicative of the quantization level.

Example 61 includes the subject matter Example 60, and wherein the quantized message comprises a header, and wherein the metadata indicative of the quantization level comprises a field of the header of the quantized message.

Example 62 includes the subject matter of any of Examples 60 and 61, and wherein each artificial neural network training algorithm value comprises a 32-bit floating point value.

Example 63 includes the subject matter of any of Examples 60-62, and wherein the quantization level comprises a 16-bit level and each quantized value comprises a fixed-point 16-bit value.

Example 64 includes the subject matter of any of Examples 60-63, and wherein the quantization level comprises an 8-bit level and each quantized value comprises a fixed-point 8-bit value.

Example 65 includes the subject matter of any of Examples 60-64, and wherein the quantization level comprises a 4-bit level and each quantized value comprises a fixed-point 4-bit value.

Example 66 includes the subject matter of any of Examples 60-65, and further including means for receiving a request to compress the message; compressing the quantized message to generate a compressed quantized message in response to receipt of the request to compress the message; and transmitting the quantized message comprises to transmit the compressed quantized message in response to compression of the quantized message, wherein the compressed quantized message comprises metadata indicative of whether the compressed quantized message is compressed.

Example 67 includes the subject matter of any of Examples 60-66, and wherein the quantized message comprises a header, and wherein the metadata indicative of whether the compressed quantized message is compressed comprises a bit of the header of the quantized message.

Example 68 includes the subject matter of any of Examples 60-67, and wherein the means for compressing the quantized message comprises means for (i) generating a bitmap indicative of one or more indices of one or more non-zero values of the message and (ii) removing one or more zero values in the message; and the means for transmitting the compressed quantized message further comprises means for transmitting the bitmap.

Example 69 includes the subject matter of any of Examples 60-68, and further including means for (i) sending the request to quantize the message to the host fabric interface and (ii) sending the request to send the message to the host fabric interface, wherein the application comprises a training algorithm for a multilayered artificial neural network.

Example 70 includes the subject matter of any of Examples 60-69, and wherein each artificial neural network training algorithm value comprises an activation value, a weight value, or a weight update value.

Example 71 includes the subject matter of any of Examples 60-70, and wherein the multilayered artificial neural network comprises a deep learning neural network.

Example 72 includes the subject matter of any of Examples 60-71, and wherein the multilayered artificial neural network comprises a convolutional neural network.

Example 73 includes the subject matter of any of Examples 60-72, and wherein the multilayered artificial neural network comprises a recurrent neural network.

Example 74 includes a computing node for receiving training algorithm data, the computing node comprising a host fabric interface, wherein the host fabric interface comprises a dequantizer to means for receiving a quantized message from a sender computing node, wherein the quantized message comprises a plurality of quantized values and metadata indicative of a quantization level; means for determining the quantization level of the quantized message based on the metadata of the quantized message; and means for dequantizing the quantized message based on the quantization level to generate a dequantized message, wherein the dequantized message comprises a plurality of artificial neural network training algorithm values, and wherein each artificial neural network training algorithm value has a higher precision than a corresponding quantized value.

Example 75 includes the subject matter of Example 74, and wherein the quantized message comprises a header, and wherein the metadata indicative of the quantization level comprises a field of the header of the quantized message.

Example 76 includes the subject matter of any of Examples 74 and 75, and wherein each artificial neural network training algorithm value comprises a 32-bit floating point value.

Example 77 includes the subject matter of any of Examples 74-76, and wherein the quantization level comprises a 16-bit level and each quantized value comprises a fixed-point 16-bit value.

Example 78 includes the subject matter of any of Examples 74-77, and wherein the quantization level comprises an 8-bit level and each quantized value comprises a fixed-point 8-bit value.

Example 79 includes the subject matter of any of Examples 74-78, and wherein the quantization level comprises a 4-bit level and each quantized value comprises a fixed-point 4-bit value.

Example 80 includes the subject matter of any of Examples 74-79, and further including means for determining whether the quantized message is compressed based on the metadata of the quantized message, wherein the metadata is further indicative of whether the quantized message is compressed; and decompressing the quantized message to generate a decompressed quantized message in response to a determination that the quantized message is compressed; wherein the means for dequantizing the quantized message comprises means for dequantizing the decompressed quantized message in response to decompression of the quantized message.

Example 81 includes the subject matter of any of Examples 74-80, and wherein the quantized message comprises a header, and wherein the metadata indicative of whether the quantized message is compressed comprises a bit of the header of the quantized message.

Example 82 includes the subject matter of any of Examples 74-81, and wherein the means for receiving the quantized message comprises means for receiving a bitmap, wherein the bitmap is indicative of one or more indices of one or more non-zero values of the uncompressed quantized message; and the means for decompressing the received message comprises means for adding one or more zero values to the quantized message based on the bitmap to generate the uncompressed quantized message.

Example 83 includes the subject matter of any of Examples 74-82, and wherein the host fabric interface further comprises means for delivering the dequantized message to an application executed by the computing node, wherein the application comprises a training algorithm for a multilayered artificial neural network.

Example 84 includes the subject matter of any of Examples 74-83, and wherein each artificial neural network training algorithm value comprises an activation value, a weight value, or a weight update value.

Example 85 includes the subject matter of any of Examples 74-84, and wherein the multilayered artificial neural network comprises a deep learning neural network.

Example 86 includes the subject matter of any of Examples 74-85, and wherein the multilayered artificial neural network comprises a convolution neural network.

Example 87 includes the subject matter of any of Examples 74-86, and, wherein the multilayered artificial neural network comprises a recurrent neural network.

The invention claimed is:

1. A computing node to send training algorithm data, the computing node comprising:
a hardware processor coupled to a host fabric interface, the host fabric interface includes a hardware network interface controller that includes:
a quantization controller to (i) receive a first request to quantize a message, the first request is indicative of a quantization level, (ii) receive a second request to compress the message, and (iii) receive a third request to send the message, the message includes one or more artificial neural network training algorithm values;
a quantizer to (i) determine the quantization level for the message in response to receipt of the third request to send the message and receipt of the first request to quantize the message, (ii) quantize the message based on the quantization level to generate a quantized message, the quantized message includes one or more quantized values, and ones of the quantized values have a lower precision than a corresponding artificial neural network training algorithm value; and
a compressor to compress the quantized message to generate a compressed quantized message in response to receipt of the second request to compress the message, to compress the quantized message includes to (i) generate a bitmap including a plurality of bits, first ones of the bits indicative of whether corresponding indices of the quantized message include non-zero values, and (ii) remove second ones of the bits corresponding to zero values from the quantized message; and
the quantizer is further to transmit the compressed quantized message to a receiver computing node in response to quantization of the message and in response to compression of the quantized message, the quantized message further includes metadata indicative of the quantization level.

2. The computing node of claim 1, wherein the quantized message includes a header, the metadata indicative of the quantization level includes a field of the header of the quantized message.

3. The computing node of claim 1, wherein ones of the artificial neural network training algorithm values include a 32-bit floating point value.

4. The computing node of claim 3, wherein the quantization level includes a 16-bit level and the ones of the quantized values include a fixed-point 16-bit value.

5. The computing node of claim 3, wherein the quantization level includes an 8-bit level and the ones of the quantized values include a fixed-point 8-bit value.

6. The computing node of claim 3, wherein the quantization level includes a 4-bit level and the ones of the quantized values include a fixed-point 4-bit value.

7. The computing node of claim 1, wherein the compressed quantized message includes metadata indicative of whether the compressed quantized message is compressed.

8. The computing node of claim 7, wherein the quantized message includes a header, the metadata indicative of whether the compressed quantized message is compressed includes a bit of the header of the quantized message.

9. The computing node of claim 7, wherein:
to transmit the compressed quantized message includes to transmit the bitmap.

10. The computing node of claim 1, further including an application to (i) send the first request to quantize the message to the host fabric interface and (ii) send the third request to send the message to the host fabric interface, the application includes a training algorithm for a multilayered artificial neural network.

11. A method to send training algorithm data, the method comprising:
receiving, by a host fabric interface of a computing node, a first request to quantize a message, the first request is indicative of a quantization level, the host fabric interface includes a hardware network interface controller of the computing node;
receiving, by the host fabric interface, a second request to compress the message;
receiving, by the host fabric interface, a third request to send the message, the message includes one or more artificial neural network training algorithm values;
determining, by the host fabric interface, the quantization level for the message in response to receiving the third request to send the message and receiving the first request to quantize the message;
quantizing, by the host fabric interface, the message based on the quantization level to generate a quantized message, the quantized message includes one or more quantized values, and ones of the quantized values have a lower precision than a corresponding artificial neural network training algorithm value;
compressing, by the host fabric interface, the quantized message to generate a compressed quantized message in response to receiving the second request to compress the message, compressing the quantized message includes (i) generating a bitmap including a plurality of bits, first ones of the bits indicative of whether corresponding indices of the quantized message include non-zero values, and (ii) removing second ones of the bits corresponding to zero values from the quantized message; and
transmitting, by the host fabric interface, the compressed quantized message to a receiver computing node in response to quantizing the message and in response to compressing the quantized message, the quantized message further includes metadata indicative of the quantization level.

12. The method of claim 11, wherein the quantized message includes a header, the metadata indicative of the quantization level includes a field of the header of the quantized message.

13. The method of claim 11, wherein ones of the artificial neural network training algorithm values include a 32-bit floating point value.

14. The method of claim 11, wherein the compressed quantized message includes metadata indicative of whether the compressed quantized message is compressed.

15. The method of claim 14, wherein the quantized message includes a header, the metadata indicative of whether the compressed quantized message is compressed includes a bit of the header of the quantized message.

16. The method of claim 14, wherein:
transmitting the compressed quantized message includes transmitting the bitmap.

17. The method of claim 11, further including:
sending, by an application executed by the computing node, the first request to quantize the message to the host fabric interface, the application includes a training algorithm for a multilayered artificial neural network; and
sending, by the application, the third request to send the message to the host fabric interface.

18. One or more computer-readable storage devices or storage disks comprising a plurality of instructions that in response to being executed cause a host fabric interface of a computing node to:
receive a first request to quantize a message, the request is indicative of a quantization level;
receive a second request to compress the message;
receive a third request to send the message, the message includes one or more artificial neural network training algorithm values;
determine the quantization level for the message in response to receipt of the third request to send the message and receipt of the first request to quantize the message;
quantize the message based on the quantization level to generate a quantized message, the quantized message includes one or more quantized values, and ones of the quantized values have a lower precision than a corresponding artificial neural network training algorithm value;
compress the quantized message to generate a compressed quantized message in response to receiving the second request to compress the message, to compress the quantized message includes to (i) generate a bitmap including a plurality of bits, first ones of the bits indicative of whether corresponding indices of the quantized message include non-zero values, and (ii) remove second ones of the bits corresponding to zero values from the quantized message;
transmit the compressed quantized message to a receiver computing node in response to quantization of the message and in response to compression of the quantized message, the quantized message further includes metadata indicative of the quantization level; and
the host fabric interface includes a hardware network interface controller of the computing node.

19. The one or more computer-readable storage devices or storage disks of claim 18, wherein the quantized message includes a header, and the metadata indicative of the quantization level includes a field of the header of the quantized message.

20. The one or more computer-readable storage devices or storage disks of claim 18, wherein ones of the artificial neural network training algorithm values include a 32-bit floating point value.

21. The one or more computer-readable storage devices or storage disks of claim 18, wherein the compressed quantized message includes metadata indicative of whether the compressed quantized message is compressed.

22. The one or more computer-readable storage devices or storage disks of claim 18, wherein the quantized message includes a header, and the metadata indicative of whether the compressed quantized message is compressed includes a bit of the header of the quantized message.

23. The one or more computer-readable storage devices or storage disks of claim 18, wherein:
to transmit the compressed quantized message includes to transmit the bitmap.

24. The one or more computer-readable storage devices or storage disks of claim 18, wherein the instructions cause the host fabric interface of the computing node to (i) send the first request to quantize the message to the host fabric interface and (ii) send the third request to send the message to the host fabric interface, an application includes a training algorithm for a multilayered artificial neural network.

* * * * *